United States Patent [19]

Graham

[11] 3,968,410

[45] July 6, 1976

[54] STATIC OVERCURRENT RELAYS

[75] Inventor: Daniel J. Graham, Glenolden, Pa.

[73] Assignee: General Electric Company, Philadelphia, Pa.

[22] Filed: Sept. 10, 1974

[21] Appl. No.: 504,785

[52] U.S. Cl. .......................... 317/36 TD; 317/33 R; 307/294
[51] Int. Cl.² .......................................... H02H 3/08
[58] Field of Search ............. 317/36 TD, 33, 141 S; 307/293, 229, 230, 294; 328/144, 142

[56] References Cited
UNITED STATES PATENTS

| | | | |
|---|---|---|---|
| 3,252,007 | 5/1966 | Saari | 328/142 |
| 3,531,689 | 9/1970 | Horn | 317/33 R |
| 3,550,020 | 12/1970 | Gill et al. | 328/142 |
| 3,628,160 | 12/1971 | Pickering | 328/144 |
| 3,697,813 | 10/1972 | Fox | 317/36 TD |
| 3,849,706 | 11/1974 | Johnson et al. | 317/36 TD |

*Primary Examiner*—J D Miller
*Assistant Examiner*—Patrick R. Salce
*Attorney, Agent, or Firm*—J. Wesley Haubner

[57] ABSTRACT

A solid state protective device is disclosed which monitors an electric quantity such as current or its negative phase sequence component in a protected circuit and which responds to abnormal increases in the value of that quantity by activating a circuit breaker or warning device after a period of time which is a non-linear inverse function of the magnitude of the circuit quantity being monitored. The device includes a non-linear function generator, using novel arrangements of operational amplifiers, to approximate the non-linear operating characteristics which are desired and in one form includes an automatic range changing feature to increase the operating range of the device.

6 Claims, 4 Drawing Figures

STATIC OVERCURRENT RELAYS

This invention relates to the protection of electric circuits and apparatus from dangerous overcurrents, and more particularly, it relates to relays which offer this protection using solid state components.

Generally, inverse time-overcurrent protective relays respond to the magnitude of a circuit quantity, such as alternating current or its negative phase sequence component for example, becoming excessive. It is desirable that the relay be designed to have an operating characteristic such that, at least for a certain range of overcurrents, the time required for the relay to operate is inversely proportional to the magnitude of the circuit quantity being monitored raised to some power. This relationship may be expressed by the formula $I^n t = k$ where I is the circuit quantity being monitored, n is an appropriate power determined by the relay's eventual application, $t$ is the response time of the relay, and $k$ is a constant. There are many known schemes to accomplish this result. While electromechanical relays have performed well for many years, improved solid state varieties are now becoming more popular. A solid state or static time-overcurrent relay typically comprises a signal sensing mechanism by which a d.c. input voltage proportional to the circuit quantity being monitored is derived, and a non-linear function generator which produces an output voltage related to this input voltage by a non-linear function which will determine the particular operating characteristic of the relay. If the quantity being monitored increases above a predetermined pick-up level, the output voltage of the function generator is integrated, and after a delay determined by the time required for the integrated voltage to reach a preset reference level, a trigger circuit is energized and the required protective action will be effected (e.g., a circuit breaker is opened or an alarm is sounded).

The operating characteristics of overcurrent relays are conventionally represented by a line or curve on a log-log plot of the time required for the relay to operate versus the magnitude of the overcurrent. The desired shape of the characteristic curve depends upon the particular application to which the relay will be put, and a particular shape will be realized by the appropriate design of the relay's function generator. Generally, circuit protective overcurrent relays are classified by the slope of this curve as either "inverse", "very inverse" or "extremely inverse". See IEEE Standard for Relays and Relay Systems associated with Electric Power Apparatus, STD 313–1971 (also ANSI Standard C37.90–1971). An extremely inverse overcurrent relay is one having a slope of 2 (i.e., $I^2 t = k$) throughout most of its operating range, but which has a decreasing slope ($n < 2$) at high current values.

One particular application for static time-overcurrent relays with which I am especially concerned is the protection of 3-phase a-c electric power generators from damage due to unbalanced phase currents. In this case the negative phase sequence component ($I_2$) of current in the stator of the machine sets up a counter-rotating flux field which causes double-frequency currents to flow in the rotor iron and slot wedges, thereby overheating the rotor. The capability of machines to withstand the heating caused by unbalanced stator currents in excess of predetermined permissible values has been expressed by the following relationship: $I_2^2 t = K$, where t is the duration of the unbalanced condition and K is a constant. Both the value of K and the range of $t$ may vary widely depending on the type, rating, and design of the generator. An overcurrent relay responsive to the negative phase sequence component of line current and having an $I_2^2 t = k$ operating characteristic over a wide range of current values (e.g., 35:1) would ideally provide the required protection in this application.

As mentioned above the shape of the relay's characteristic curve is determined by the design of the relay's function generator, and many different function generators have been heretofore proposed. In Conference Paper CP62–1091, presented to the American Institute of Electrical Engineers in June 1962, E. W. Kimbark disclosed a static inverse timeovercurrent relay including a function generator, or voltage modifying circuit, consisting of a network of diodes and resistors which alter the d.c. voltage applied to an integrating RC circuit as a function of the amount of overcurrent in the protected line. This scheme has the disadvantage that it requires relatively large input signals and it imposes a relatively high burden on the instrument current transformers. Furthermore the breakpoints of such a network tend to be load dependent, and if a squaring function were desired over a very wide range of overcurrent values, the number of breakpoints would become impractically large.

In the concurrently filed copending application Ser. No. 504,772, filed Sept. 10, 1974, of D. W. Little and assigned to the assignee of the present invention, an improved static relay is disclosed having a function generator which contemplates the use of a reverse biased operational amplifier having a feedback loop so arranged that the gain of the function generator will decrease in at least one discrete step at selected magnitudes of increasing overcurrent in order that the characteristic of the relay approximate that of either an "inverse" or a "very inverse" time-overcurrent relay. This scheme eliminates the leading problems mentioned above.

Another approach that has heretofore been proposed in the static overcurrent relay art is to use log and antilog function generators ahead of an integrator. See U.S. Pat. No. 3,531,689. While this approach can produce an ideal $I^2 t = k$ characteristic, it is comparatively expensive since it contemplates the use of operational amplifiers having transistorized feedback loops and these feedback transistors require temperature compensation which is relatively expensive to provide. Furthermore, this approach will not match the operating characteristic of extremely inverse relays at high current values, since the slope in this region must decrease as mentioned above.

Special problems are encountered in designing a function generator whose output varies with input raised to the second power or higher where the input signal is expected to vary over an extremely wide range, as in the case of the aforesaid negative phase sequence overcurrent relay. The error-to-signal ratio of such generators may become excessive where a squaring function has to be preserved throughout such a range of input values, and since a relatively modest increase in input signal magnitude (e.g., 20:1) will cause a much greater increase in output signal magnitude (e.g., 400:1), the maximum signal limits of solid state components in the device may be exceeded.

Accordingly, it is an object of my invention to provide an improved static overcurrent relay having a novel function generator well suited for obtaining a variety of operating characteristics and which is characterized by its relatively low cost, low burden, and stable operating characteristic over a wide range of temperatures.

It is a further object of my invention to provide an improved static relay having an extremely inverse operating characteristic.

It is still another object of my invention to provide an inverse time-overcurrent relay which is operable over an extremely wide range of input currents and operating times.

It is a further object of my invention to provide a novel static relay which is responsive to negative phase sequence currents.

In carrying out my invention in one form, I provide a suitable signal sensing mechanism, for example a current transformer used to monitor alternating current in a protected circuit, and full wave rectification means to provide a unipolar voltage input signal proportional to the monitored circuit quantity. This signal is supplied to a non-linear function generator composed of a reverse biased operational amplifier having one or more operational amplifiers in its feedback loop depending upon the function being generated. If the magnitude of the monitored quantity rises above a predetermined pick-up point, the output of the function generator is integrated by an operational amplifier having capacitive feedback, and the integrated output signal is compared to an appropriate reference level by an operational amplifier used as a level detector. When the reference level is exceeded a trip signal is produced. In one embodiment, if the monitored quantity exceeds a preselected level, a scale changing means automatically becomes effective to reduce the magnitude of the input signal while making a corresponding alteration of the time constant of the integrator.

The operational amplifiers used in my relays are relatively inexpensive, highly reliable and operate at low signal levels, and since they have very low output impedance the relay's function generator has breakpoints independent of the load and does not appreciably affect the time constant of the integrator, thus greatly simplifying design. Furthermore when equipped with my novel scale changing feature the relay operates reliably and accurately over an extremely wide range of times and currents.

This invention will be more fully understood and its various objects and advantages will be more fully appreciated from the following description taken in conjunction with the accompanying drawings in which.

Figure 1:
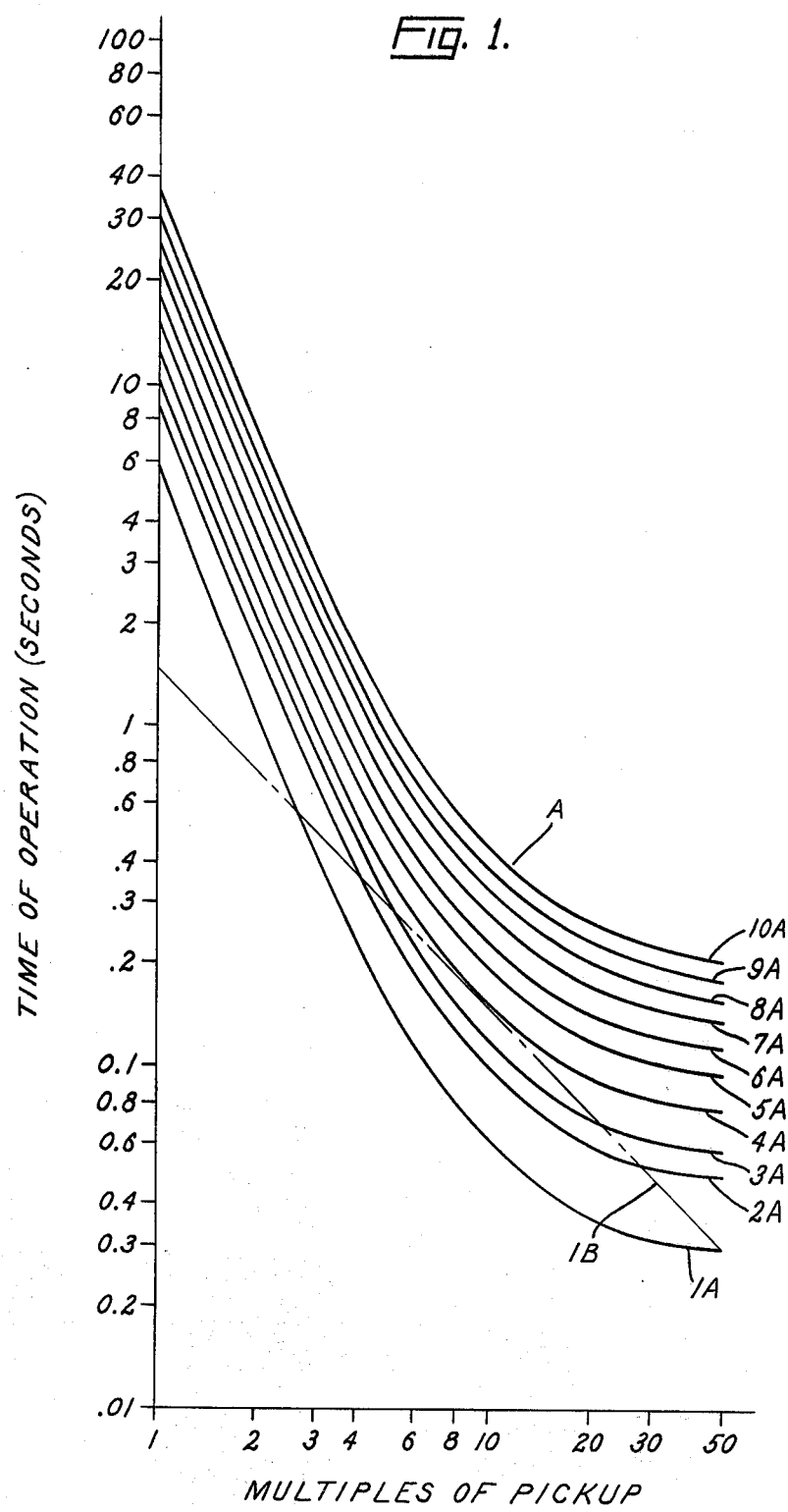
FIG. 1 is a chart of operating time plotted against multiples of overcurrent used to illustrate the operating characteristic of an "extremely inverse" time-overcurrent relay constructed in accordance with a first form of the present invention.

Referring now specifically to the drawings, the family of curves A shown in FIG. 1 depict the operating characteristics of an extremely inverse overcurrent relay embodying my invention in one form. The curves are plotted on a log-log scale with the ordinate representing the log of the time of operation of the relay and the abscissa representing the log of multiples of pick-up current, i.e., multiples of the minimum current which will cause the relay to respond. The particular curves 1A–10A of the family shown in FIG. 1 correspond to different "time-dial" settings as will be more fully explained below.

Figure 2:
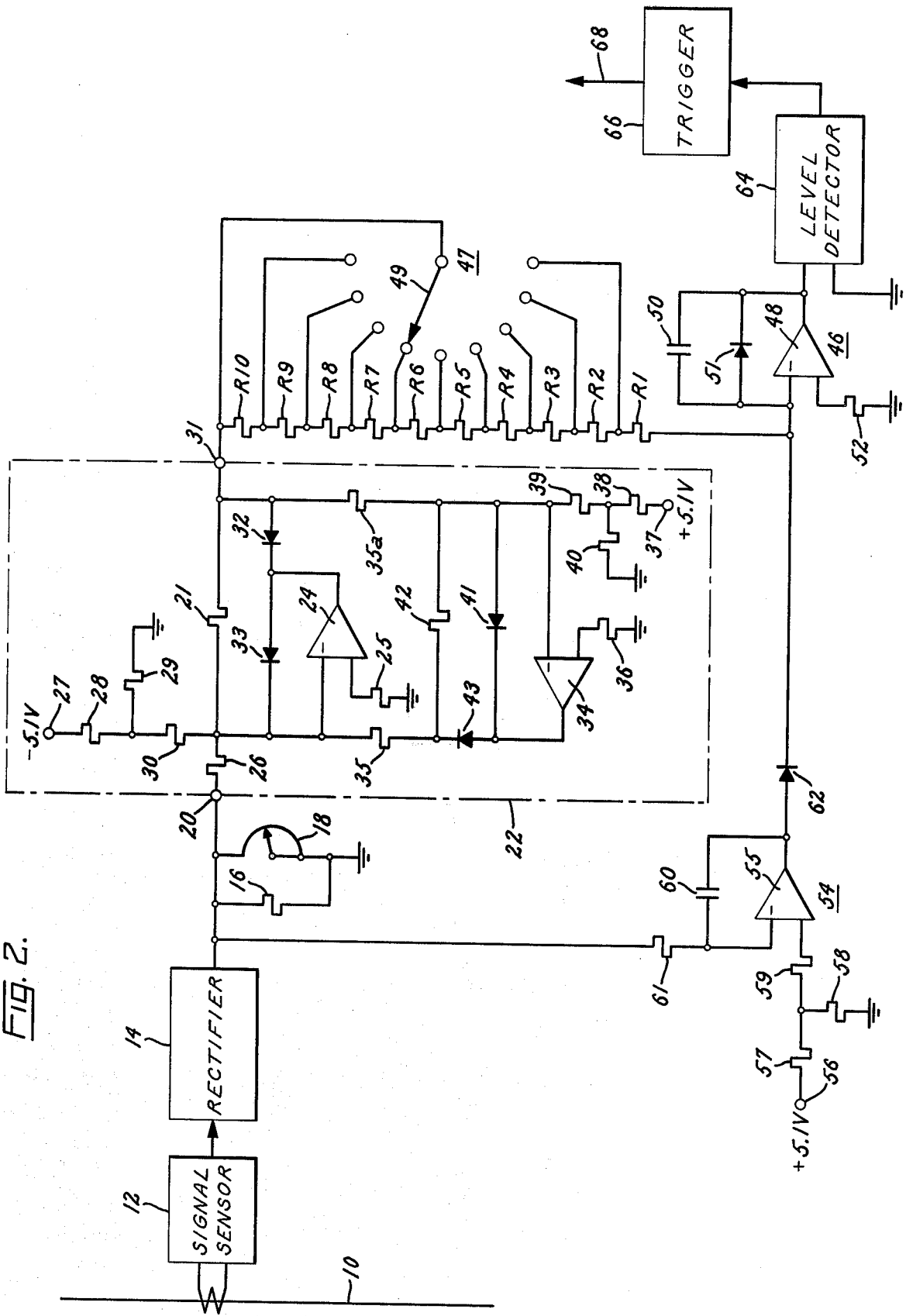
FIG. 2 is a schematic circuit diagram of the extremely inverse relay embodying my invention.

FIG. 2 illustrates a protective relay circuit embodying my invention and having the extremely inverse time-overcurrent characteristics shown in FIG. 1. The relay includes a signal sensor 12 which is suitably coupled to an alternating current circuit or line 10 so as to respond to a predetermined electric quantity in the protected line 10, namely current. A current sensor well suited for this purpose is described in the copending application of Little (supra), although other sensors could be used and other circuit quantities could be responded to if desired.

The alternating current output of signal sensor 12 is rectified by a full wave rectifier 14 and fed through resistors 16 and 18 to derive a unipolar voltage input signal of variable amplitude representative of the current in the protected line 10. The input signal is supplied to the input terminal 20 of a function generator 22, with the polarity of this terminal being positive relative to a common potential bus (shown as ground). The resistance 18 is adjustable and is set so that the input signal has a predetermined low amplitude (e.g. 200 millivolts) when the current in the protected line is normal. No smoothing capacitor is connected across the d.c. terminals of rectifier 14, whereby the input signal applied to the input terminal 20 is a train of undulating half cycles of unipolar voltage whose instantaneous magnitude is proportional to the instantaneous magnitude of line current.

The function generator 22 is composed of a first operational amplifier 24 having its non-inverting input connected to the common potential bus by resistor 25. The inverting input is connected to the input terminal 20 of function generator 22 by resistor 26 and to a suitable negative voltage source 27 by a network of resistors 28, 29 and 30. Voltage source 27 is used to reverse bias the amplifier 24, and the purpose of this bias signal is more fully discussed in the copending application of Little (supra). The output of operational amplifier 24 is connected to the output terminal 31 of function generator 22 through a diode 32. The output of amplifier 24 is also connected to its inverting input through another diode 33. Between output terminal 31 and its inverting input, operating amplifier 24 has a feedback path containing resistor 21.

In accordance with my invention, the feedback loop of operational amplifier 24 includes an additional branch, in parallel with resistor 21, comprising a second operational amplifier 34 which is connected at its inverting input to the output terminal 31 of the function generator by resistor 35a and at its output to the inverting input of operational amplifier 24 through resistor 35 and diode 43. The non-inverting input of the operational amplifier 34 is connected to the common potential bus by resistor 36 and a suitable positive voltage source 37 is connected to the inverting input of this amplifier through resistors 38, 39 and 40. Operational amplifier 34 has a feedback path containing two parallel branches, one containing diode 41 and the other resistor 42.

The gain of function generator 22 changes depending upon the magnitude of the input signal applied to terminal 20. So long as the magnitude of the input signal is less than that of the oppositely poled, relatively low bias signal contributed to the inverting input of operational amplifier 24 by the components 27–30, no voltage will be developed at output terminal 31 due to the polarity of diodes 32 and 33, and the function generator gain will in effect be zero. However, when the magnitude of the input signal exceeds this bias, the net signal at the inverting input of the amplifier 24 is positive, the diode 32 conducts and the diode 33 blocks, a relatively negative output signal is produced at the terminal 31 and function generator 22 exhibits a first substantially constant gain equal to the ratio of the resistance value of resistor 21 to that of the input resistor 26 (e.g., a ratio of about 20 K ohms to 16.9 K ohms). This gain will be effective so long as the magnitude of the input signal is in a first predetermined range. The minimum limit of this first range is determined by the bias due to source 27 while the maximum limit is determined by the bias due to source 37. The input signal enters a second predetermined range, whose minimum limit equals the maximum limit of the first predetermined range, when the negative output voltage developed at the terminal 31 causes the current through the input resistor 35a of the feed-back operational amplifier 34 to exceed the oppositely poled current in the resistor 39 due to the bias voltage source 37. This occurs for example when the input signal attains a magnitude of 0.4 volts, and at this break-point the gain of the function generator 22 switches to a second substantially constant value (e.g., 3.25) which is higher than the first gain. This second gain remains effective for input signal magnitudes within the second range whose maximum limit is determined by saturation of the operational amplifier 24.

The output signal of function generator 22, developed at output terminal 31, is supplied to an integrator 46 which preferably comprises a time dial 47 and an integrating operational amplifier 48. The time dial consists of a series of resistors R1 – R10 accessed by a rotary switch 49. The position of the switch determines the number of resistors in series between output terminal 31 and the non-inverting input of operational amplifier 48, thus determining the time constant of integrator 46. The higher the series resistance of the time dial, the slower will be the rate of integration and operation of the relay. Particular "time dial" settings, as determined by rotary switch 49, correspond to particular curves in the family of characteristic curves A shown in FIG. 1. The illustrated integrator 46 includes operational amplifier 48 having capacitive feed-back (via integrating capacitor 50 in parallel with diode 51), but an RC circuit or other integrating means could be substituted as is well known in the art. The non-inverting input of the operational amplifier 48 is connected to the common potential bus through resistor 52.

A pick-up level detector and reset circuit 54 keeps the integrator 46 ineffective until the average value of the rectified input signal is above a preselected value which indicates that excessive current is flowing in protected line 10. Pick-up level detector 54 is preferably an operational amplifier 55 whose non-inverting input is referenced by a selected reference signal derived from positive voltage source 56 through resistors 57, 58, 59 and whose feed-back loop contains capacitor 60. The inverting input is connected to rectifier 14 via an input resistor 61, and the output is connected to integrator 46 through a diode 62. Operational amplifier 55 averages the magnitude difference between the input signal and the reference signal. The reference level is selected such that the average magnitude of the input signal will equal or exceed it whenever the current in protected line 10 rises to at least a certain percent higher than normal. Normally the output of operational amplifier 55 is positive and the diodes 62 and 51 conduct, however when pick-up is reached, this output becomes negative, diodes 51 and 62 block, and capacitor 50 begins to accumulate charge.

The integrated signal produced by the integrator 46 is fed to a suitable level detector 64 preferably comprising an operational amplifier with appropriate feed-back as is well known in the art, but other suitable devices may be utilized instead. When a preselected level is reached an output is emitted from level detector 64 and a trip signal is issued to a trigger circuit 66. In response to this trip signal, the trigger circuit produces an output signal 68 which can be used to initiate the opening of a circuit breaker in line 10 or to activate an alarm or the like.

In the relay just described, the rate of integration of integrator 46 is proportional to the average magnitude of the output signal of function generator 22. Since the time required for the integrated signal to reach the reference level of the level detector 64 is proportional to the rate of integration, the time necessary for the relay to trip depends on the gain of its function generator, i.e., the lower the gain of the function generator the longer the time that will be required for the relay to trip in response to a given amount of overcurrent.

To illustrate the effect of the multiple gains of my function generator 22, I have shown in FIG. 1, a dotted-line curve 1B representing the operating characteristic that would be obtained if an inverse time-overcurrent relay were not equipped with any non-linear function generating means but were otherwise the same as shown in FIG. 2 (with the time dial setting of curve 1A). A comparison of the curves 1A and 1B will reveal that the operation of my relay has been slowed by the function generator at low overcurrents (e.g., less than two times pick-up) but hastened at higher overcurrents (e.g., between 2 and 8 times pick-up) compared to the hypothetical relay. The initial slowdown at relatively small input signal levels is achieved by virtue of the input bias due to source 27 which is of opposite polarity to the input signal. Since this bias is a significantly higher percentage of a small input signal than of a larger one, it appreciably reduces the average value of the output signal of the function generator 22, and hence retards the rate of integration of the integrator 46, for an input signal of given small magnitude while having little effect for larger signals. The relative acceleration of the relay's operation at higher input signal levels (e.g., overcurrents between 2 and 10 times pickup) is the result of changing the gain of the function generator from its first constant value when the input signal magnitude is in the aforesaid first range to a second higher value once the input signal attains the minimum limit of its second range. Finally, at extremely high overcurrents (e.g., greater than 10 times pickup), the operational amplifier 24 of the function generator goes into saturation, and consequently in this range the operating characteristic of my relay approaches the desired "extremely inverse" characteristic curve called for in the standards mentioned above.

The relay just described, wherein an extremely inverse characteristic is obtained by increasing the gain of the function generator as the magnitude of the input signal increases, may be contrasted with the relay disclosed in the aforementioned application of Little in which the function generator gain decreases at various input signal breakpoints of progressively increasing magnitude.

Figure 3:
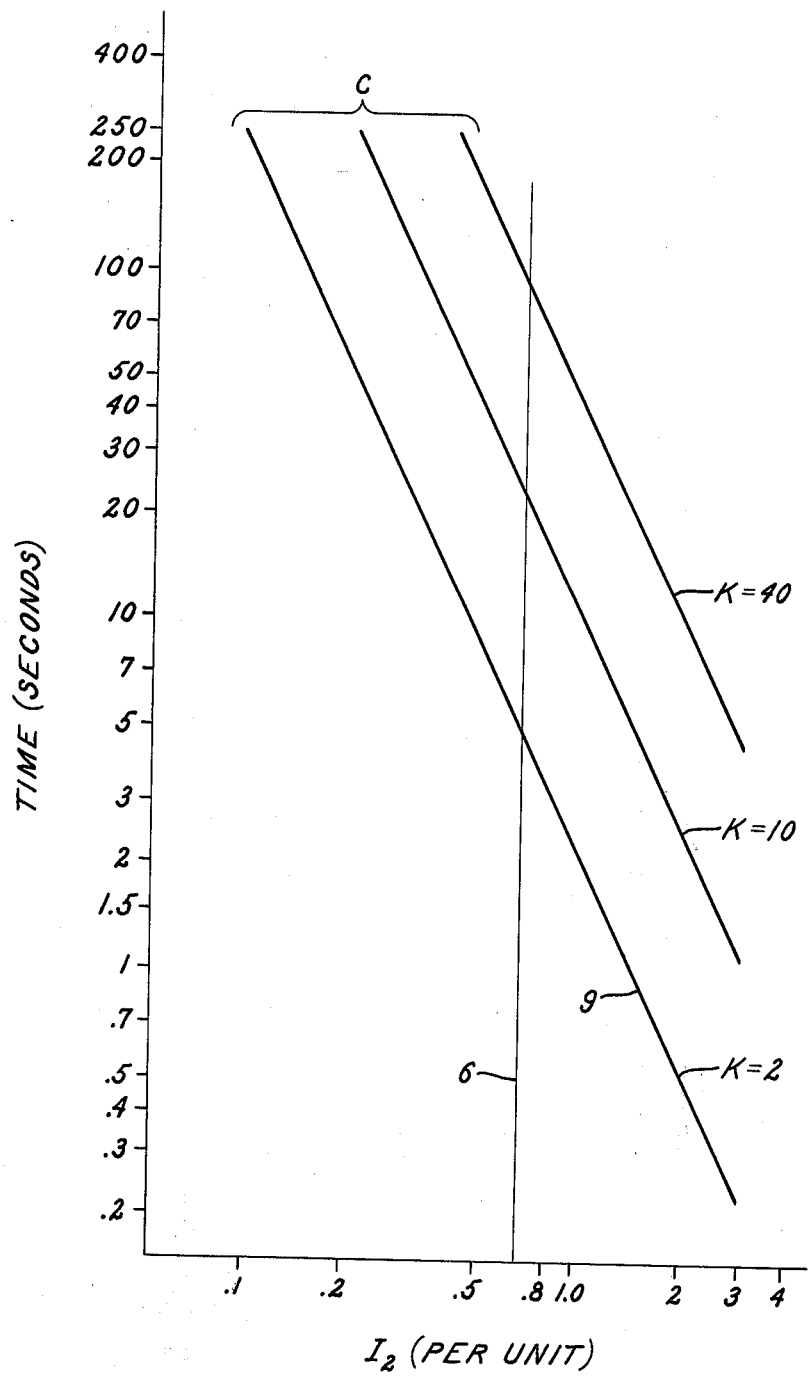
FIG. 3 is a chart of operating time plotted against multiples of overcurrent used to illustrate the operating characteristics of a negative phase sequence overcurrent relay constructed in accordance with a second form of the present invention.

FIG. 3 illustrates a family of curves C which represent the operating characteristics of another relay incorporating a second embodiment of my invention. This device is used for the protection of generators from overheating caused by negative phase sequence currents due to unbalanced faults or loads. These curves are also plotted on a log-log scale with the ordinate again representing the time of operation of the relay. The abscissa represents a ratio of the negative phase sequence current to the positive sequence stator current of the generator at full load. The particular curves of family C represent $I^2t$ operating characteristics for different K factors, K being determined by the particular machine being protected.

Figure 4:
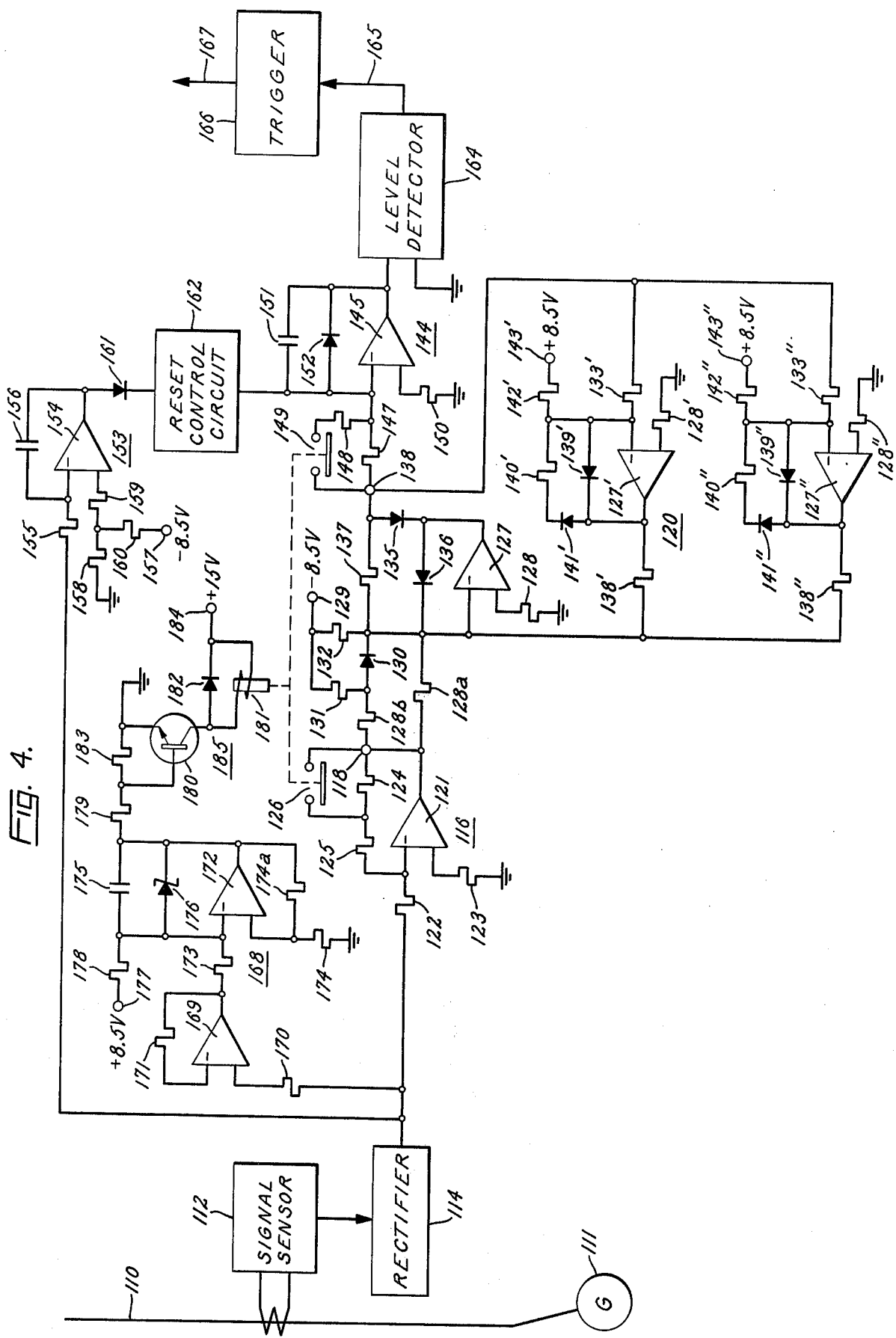
FIG. 4 is a schematic circuit diagram of the negative phase sequence overcurrent relay embodying my invention.

The curves of FIG. 3 are typical of the operating characteristic of the relay circuit shown in FIG. 4 in which the single line 110 represents a three-phase power circuit emanating from the protected generator 111. Coupled to line 110 is a signal sensor 112 which comprises a symmetrical component segregating network capable of producing a voltage proportional to the negative phase sequence current in the stator windings of the protected generator. Such networks are well known in the art (see for example U.S. Pat. Nos. 2,897,407—Morris and 3,154,737—Hodges). The alternating voltage output of the signal sensor 112, after first being passed through a band-pass filter (not shown) to reject unwanted harmonics, is rectified by suitable rectification means 114 to provide a unipolar voltage input signal of variable amplitude proportional to the negative phase sequence current. This input signal, which is of negative polarity relative to the common potential bus, is amplified and inverted by amplifier circuit 116 to provide a modified input signal for a function generator 120. Amplifier circuit 116 is preferably an operational amplifier 121 having its inverting input connected to the output of rectifier 114 by an input resistor 122, its non-inverting input connected to common by resistor 123, and having a feedback path containing resistors 124 and 125 in series. Resistor 125 is shunted by a normally open contact 126 whose operation will be more fully explained below. The modified voltage input signal which is developed at the output terminal of operational amplifier 121 is related to the input signal by the gain of amplifier circuit 116. Preferably the resistance values of feedback resistors 124 and 125 and input resistor 122 are selected such that amplifier circuit 116 has a gain of a first predetermined amount (e.g., 5) when contact 126 is open and a second predetermined amount (e.g., 1) when the contact is closed and resistor 124 is shorted. Thus the input signal is modified by amplifier circuit 116 by an amount determined by the position of contact 126.

This modified input signal is applied to the input terminal 118 of the function generator 120. In this embodiment of my invention function generator 120 comprises an operational amplifier 127 having two additional amplifiers 127' and 127'' in its feedback path. All three amplifiers are connected at their non-inverting inputs to the common potential bus by resistors 128, 128', 128'' respectively. The inverting input of operational amplifier 127 is connected to the input terminal 118 of function generator 120 via an input resistor 128a shunted by another input resistor 128b in series with diode 130, and it is also connected to a negative voltage source 129 via a resistor 132. Another resistor 131 is connected between the source 129 and the juncture of resistor 128b and diode 130. The output of operational amplifier 127 is connected to the output terminal 138 of function generator 120 through a diode 135. The output of operational amplifier 127 is connected to its inverting input by a feed-back path containing diode 136. Between output terminal 138 and its inverting input, operational amplifier 127 has another feed-back loop consisting of three main parallel branches. The first of these branches contains resistor 137, while the second and third branches respectively contain the operational amplifiers 127' and 127'' in series with their respective input resistors 133' and 133'' and output resistors 138' and 138''. The inverting inputs of amplifiers 127' and 127'' are respectively biased through resistors 142' and 142'' by positive voltage sources 143' and 143''.

Similar to the first embodiment, the gain of the function generator 120 varies with the magnitude of the modified input signal applied to terminal 118. So long as the magnitude of the modified input signal (which is positive after emerging from amplifier 116) is less than that of the oppositely poled, relatively low bias signal contributed by source 129 to the inverting input of operational amplifier 127, no voltage will be developed at output terminal 138 due to the polarity of diodes 135 and 136, and the function generator gain will in effect be zero. However, when the magnitude of the modified input signal exceeds this bias, the net signal at the inverting input of the amplifier 127 is positive, the diode 135 conducts and the diode 136 blocks, a relatively negative output signal is produced at the terminal 138, and function generator 120 exhibits a first substantially constant gain equal to the ratio of the resistance values of resistor 137 to resistor 128a (e.g., a ratio of about 15 K ohms to about 46.5 K ohms). Resistor 128b initially has no effect on the gain for the reason that diode 130 is not conducting because the potential of its anode is then relatively negative with respect to its cathode which is held at virtual ground. This first gain will be effective so long as the magnitude of the modified input signal is in a first predetermined range. The minimum limit of this first range is determined by the bias due to source 129 while the maximum limit is determined by the bias due to source 143'.

The modified input signal enters a second predetermined range, whose minimum limit equals the maximum limit of the first predetermined range, when the output voltage developed at output terminal 138 causes the current through the input resistor 133' of the feedback operational amplifier 127' to exceed the current through resistor 142' due to source 143'. This occurs for example when the modified input signal attains a magnitude of 2.25 volts, and at this break-point the gain of function generator 120 switches to a second substantially constant value (e.g., 0.588) which is higher than the first gain. If the overcurrent were more severe, the magnitude of the modified input signal may increase to a maximum limit (about 4 volts) of the second range and enter a third predetermined range in which the voltage at output terminal 138 will cause current in the input resistor 133″ of the second feedback operational amplifier 127″ to exceed the bias signal applied to this amplifier due to source 143″. Now the latter amplifier becomes effective and the function generator 120 will exhibit a third substantially constant gain equal to about 1.06 which is higher than the second gain.

The maximum value of the third predetermined range is established by a voltage divider comprising resistors 128b and 131 whose junction is connected to the anode of the diode 130. When the modified input signal increases to about 7 volts the potential at this junction becomes positive with respect to ground, the diode 130 will begin to conduct, and when this occurs the input resistance of the operational amplifier 127 decreases because of the parallel combination of resistors 128a and 128b. Since the input resistance decreases, the gain of function generator 120 will increase to a fourth substantially constant value (e.g., 1.77).

The output signal of function generator 22 which is developed at output terminal 138 is applied to an integrator 144 comprising an integrating operational amplifier whose inverting input is connected to output terminal 138 by resistor 147. Resistor 147 is shunted by resistor 148 in series with a normally open contact 149 (the purpose of which will be more fully explained below). Operational amplifier 145 is connected to common via resistor 150 at its non-inverting input and has a feed-back loop or path containing integrating capacitor 151 in parallel with diode 152. A pick-up level detector circuit 153 keeps the integrator 144 inoperative until a overheating condition is present in the protected generator, as indicated by excessive negative phase sequence current in the line 110. Pick-up level detector 153, which operates similarly to level detector 54 in the first embodiment, is comprised of an operational amplifier 154 having an input resistor 155 connected to the rectifier 114, a feed-back loop containing capacitor 156, and a reference applied by negative voltage source 157 through resistors 158, 159 and 160. The output of pick-up level detector circuit 153 is applied via diode 161 to a reset control circuit 162 which in turn is connected to the integrator 144 as shown. The output of pick-up circuit 153 is negative until the average magnitude of the input signal exceeds the reference level, whereupon the diode 161 becomes forward biased to disable the reset control circuit 162 which then permits charge to accumulate on capacitor 151. When the input signal subsequently falls below its pick-up level, due to the protective operation of the relay or to prior subsidence of the disturbance causing excessive negative sequence current, it is essential that the relay not be completely reset until the generator rotor has time to cool down. Accordingly, it is the purpose of the reset control circuit 162 to delay the discharge of the integrating capacitor 151 whenever the pick-up circuit 153 drops out, and this feature of the illustrated relay is the subject matter of my copending application Ser. No. 509,879 filed Sept. 27, 1974.

The integrated output signal from integrator 144 is applied to a suitable level detector 164 which produces a trip signal 165 in similar fashion to that described in connection with the first embodiment. Trip signal 165 causes trigger circuit to generate the required output signal 167.

The operation of my negative phase sequence overcurrent relay as thus far described is similar to that of the overcurrent relay shown in FIG. 2, except the function generator 120 of the FIG. 4 relay has several more breakpoints which enable the operating characteristic of this relay to closely match an $I_2{}^2 t = K$ characteristic over a range of $I_2$ magnitudes from about 0.1 per unit to somewhat above 0.5 per unit. The latter value of $I_2$ corresponds to a level of the modified input signal as applied to the function generator 120 at which the fourth and highest gain of this generator becomes effective. For increasing values of $I_2$ within this range, the operating time of a relay which is adjusted so that K = 2 will decrease from 250 seconds to approximately 5 seconds. In practice it is desired to extend the operating range to 3.0 per unit in terms of current and to 0.2 seconds in terms of time. If this were accomplished by adding more feed-back branches to the function generator 122 to obtain additional upbreaks in its gain, the output of the function generator would have to extend over such a wide range that errors and inaccuracies would be introduced and dangerous electric stress might be imposed on the relay. Therefore, in accordance with my invention, range changing means 168 is included to eliminate these problems.

Range changing means 168 comprises a buffer amplifier 169, a level detector 172 and an auxiliary relay 185. The buffer amplifier 169 is preferably an operational amplifier, the non-inverting input of which is connected through a resistor 170 to the output of rectifier 114 and the feedback loop of which contains resistor 171. The output of this amplifier is therefore proportional to the input signal applied to function generator 120. The input signal after emerging from buffer amplifier 169 is applied to a level detector comprising operational amplifier 172 whose non-inverting input is connected to common by resistor 174 and also to its output by resistor 174a. Amplifier 172 has a feed-back path containing capacitor 175 and zener diode 176 connected in parallel. Its input is biased by positive voltage source 177 through resistor 178, and its output is connected by resistor 179 to the base of transistor 180 of auxiliary relay 185. The collector of transistor 180 is connected to the parallel combination of the operation coil 181 of auxiliary relay 185 and diode 182, while the emitter is connected to common. The emitter is also connected to the base via resistor 183. Coil 181 is connected to a suitable positive voltage source 184. Transistor 180 is normally off and no current is flowing through coil 181. However, when the peak magnitude of the input signal applied to the inverting input of operational amplifier 172 rises to at least a value predetermined by the bias signal due to source 177, (e.g., about 1.4 volts) the charge on capacitor 175 reverses polarity and transistor 180 automatically turns on. When transistor 180 switches, current begins to flow in coil 181 thus simultaneously closing contacts 126 and 149 of the auxiliary relay 185.

It should be noted that if the input signal has an average magnitude just equal to or barely above the predetermined value that causes the relay 185 to operate, there are intermittent cyclic intervals of appreciable duration when the instantaneous magnitude of the signal is lower than this value. There is a tendency during these intervals for the output of the operational amplifier 172 to momentarily resume its normal negative polarity, in which event the auxiliary relay 185 might periodically drop out and cause undesirable chattering of the contacts 126 and 149. To avoid this result, the operational amplifier 172 is provided with positive feedback through the resistor 174a. The resistance value of resistor 174a is selected such that contacts 126 and 149 once closed will remain closed until the average magnitude of the input signal drops more than 10 percent below that value (e.g., 2 volts) which is required to cause range changing means 168 to become effective. While illustrated as an electromagnetic relay with separable contacts, the auxiliary relay 185 could be an electronic or static relay capable of performing this same function.

When the illustrated relay 185 operates to close its contact 126, resistor 124 in the feedback loop of amplifier 116 is shunted and the gain of this amplifier drops from approximately 5 to about 1. The value of the bias due to source 177 is chosen so that the contacts close at an input signal and therefore at an overcurrent higher than that which causes the fourth gain of function generator 120 to become effective. The value of the input signal at which range changing means 168 operates is illustrated by vertical line 6 in FIG. 3. Upon decreasing the magnitude of the modified input signal by one-fifth, function generator 120 once again exhibits its first gain. If the modified input signal continues to increase from the magnitude it resumed when the input signal has reached its range-changing value, the second, third and fourth gains may again become effective. It should be noted, however, that since the time required for the relay to produce its trip signal is dependent on the average magnitude of the function generator output signal, and since the modified input signal to the function generator has been reduced by a factor of 5, unless the time constant of integrator 144 is altered, the relay will take too long to trip for overcurrents of a magnitude sufficient to cause range changing means 168 to be effective. Accordingly, contact 149 is closed simultaneously with the closing of contact 126 to bring resistors 147 and 148 in parallel, thus shortening the time constant of integrator 144 by a factor of 25. This factor is the nth power (n = 2 for the illustrated function generator) of the ratio of the amounts of amplifier 116 gain before and after the range is changed, and it prevents any discontinuity in the operating characteristic at the relay when the modified input signal decreases due to the reduced amount of gain. As can be seen from FIG. 3, use of my novel range changing feature will almost double the operating range of my device by producing the straight line portion 9 of the K = 2 characteristic curve for overcurrents greater than 0.7 per unit, shown by vertical line 6.

It will be apparent to those skilled in the art that while a function generator has been described having four different gains in order to produce a piecewise linear approximation of a squaring function, more breakpoints could be provided if increased accuracy were desired.

While I have shown and described several forms of my invention by way of illustration, other modifications will surely occur to those skilled in the art. It is contemplated, therefore, by the claims which conclude this specification to cover all such modifications as fall within the true spirit and scope of the invention.

What I claim as new and desire to secure by Letters Patent of the United States is:

1. A protective relay adapted to be coupled to an alternating current circuit in order to produce a trip signal in delayed response to the value of a circuit quantity becoming excessive, said relay comprising:
   a. means for deriving from said circuit an input signal of variable amplitude representative of said quantity;
   b. amplifying means connected to said input signal deriving means for providing a modified input signal the amplitude of which is related to the amplitude of said input signal by the gain of said amplifying means;
   c. function generating means for producing an output signal whose magnitude is a function of said modified input signal amplitude raised to some power greater than one;
   d. integrating means having an input terminal to which said output signal is supplied and being operative whenever said quantity becomes excessive for producing an integrated output signal which increases in magnitude at a rate dependent upon the value of the time constant of said integrating means;
   e. range changing means for automatically changing the gain of said amplifying means from a first relatively high amount to a second lower amount and for simultaneously changing the time constant of said integrating means from a first relatively long value to a second shorter value whenever the magnitude of said input signal exceeds a predetermined value; and
   f. means connected to said integrating means for producing a trip signal whenever the magnitude of said integrated output signal exceeds a preselected level.

2. A protective relay as defined in claim 1 in which the ratio of first to second values of said time constant approximately equals the ratio of first to second amounts of said gain raised to said power.

3. A protective relay as defined in claim 2 in which said amplifying means comprises an operational amplifier having a gain which can be changed from said first amount to said second amount.

4. A protective relay as defined in claim 2 in which said integrating means comprises an operational amplifier having a resistive input circuit and a capacitive feed-back path.

5. A protective relay as defined in claim 4 in which said range changing means includes means for reducing the resistance value of the input circuit of said integrating means whenever the input signal magnitude reaches said predetermined value.

6. A protective relay adapted to be coupled to an alternating current circuit in order to produce a trip signal in delayed response to the value of a circuit quantity becoming excessive, said relay comprising:
   a. means for deriving from said circuit a unipolar voltage input signal of variable amplitude representative of said quantity,
   b. amplifying means connected to said input signal deriving means for providing a modified input signal the amplitude of which is related to the amplitude of said input signal by the gain of said amplifying means;
   c. function generating means having an input terminal to which said modified input signal is supplied and an output terminal at which is produced an output signal related to said modified input signal by a first substantially constant gain so long as the magnitude of said modified input signal is within a first predetermined range, by a second substantially constant gain higher than said first gain when the magnitude of said modified input signal is within a second predetermined range whose minimum limit equals the maximum limit of said first range, and by a third substantially constant gain higher than said second gain when the magnitude of said modified input signal is within a third predetermined range whose minimum limit equals the maximum limit of said second range, d. integrating means having an input terminal to which said output signal is supplied and being operative whenever said quantity becomes excessive for producing an integrated output signal which increased in magnitude at a rate dependent upon the value of said integrating means;

e. range changing means for automatically changing the gain of said amplifying means from a first relatively high amount to a second lower amount and for simultaneously changing the time constant of said integrating means from a first relatively long value to a second shorter value whenever the magnitude of said input signal exceeds a predetermined value; and f. means connected to said integrating means for producing a trip signal whenever the magnitude of said integrated output signal exceeds a preselected level.

* * * * *